United States Patent [19]
Yao et al.

[11] Patent Number: 5,983,114
[45] Date of Patent: *Nov. 9, 1999

[54] METHOD AND APPARATUS FOR MONITORING LINK ACTIVITY TO PREVENT SYSTEM DEADLOCK IN A DISPATCH SYSTEM

[75] Inventors: Yu-Dong Yao, San Diego; Matthew S. Grob, La Jolla, both of Calif.

[73] Assignee: Qualcomm Incorporated, San Diego, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/669,778

[22] Filed: Jun. 26, 1996

[51] Int. Cl.$^6$ ...................................................... H04B 7/26
[52] U.S. Cl. ............................ 455/509; 455/515; 455/518
[58] Field of Search .................................. 455/33.1, 33.4, 455/34.1, 53.1, 54.1, 54.2, 56.1, 57.1, 58.1, 58.2, 67.1, 73, 78, 79, 88, 89, 509, 515, 517, 518, 524, 507, 422, 527; 370/252, 432, 433, 442, 443, 444, 465, 468, 477, 528, 278, 340, 312, 341

[56] References Cited

U.S. PATENT DOCUMENTS

| | | | |
|---|---|---|---|
| Re. 32,789 | 11/1988 | Lynk, Jr. et al. | 379/58 |
| 4,813,040 | 3/1989 | Futato | 370/477 |
| 4,833,701 | 5/1989 | Comroe et al. | 379/60 X |
| 5,095,529 | 3/1992 | Comroe et al. | 455/16 |
| 5,101,502 | 3/1992 | Felderman et al. | 455/34.1 |
| 5,325,432 | 6/1994 | Gardeck et al. | 380/21 |
| 5,369,781 | 11/1994 | Comroe et al. | 455/15 |
| 5,387,905 | 2/1995 | Grube et al. | 340/825.52 |
| 5,400,361 | 3/1995 | Brauns et al. | 375/10 |
| 5,420,999 | 5/1995 | Ng et al. | 379/58 |
| 5,450,405 | 9/1995 | Maher et al. | 370/58.2 |
| 5,463,617 | 10/1995 | Grube et al. | 370/29 |
| 5,465,391 | 11/1995 | Toyryla | 455/33.4 |
| 5,473,605 | 12/1995 | Grube et al. | 370/62 |
| 5,491,835 | 2/1996 | Sasuta et al. | 455/34.1 |
| 5,507,006 | 4/1996 | Knight | 455/54.1 |
| 5,511,232 | 4/1996 | O'Dea et al. | 455/54.1 |
| 5,513,381 | 4/1996 | Sasuta | 455/34.1 |
| 5,535,429 | 7/1996 | Bergenlid et al. | 455/34.1 |
| 5,542,108 | 7/1996 | Sasuta | 455/34.1 |
| 5,594,948 | 1/1997 | Talarmo et al. | 455/54.2 |
| 5,612,955 | 3/1997 | Fernandes et al. | 370/528 |
| 5,634,197 | 5/1997 | Paavonen | 455/58.1 |

FOREIGN PATENT DOCUMENTS

| | | |
|---|---|---|
| 9307685 | 4/1993 | WIPO . |
| 9430026 | 12/1994 | WIPO . |
| 9600482 | 1/1996 | WIPO . |

*Primary Examiner*—Thanh Cong Le
*Attorney, Agent, or Firm*—Russell B. Miller; Thomas M. Thibault

[57] ABSTRACT

Method and apparatus to prevent system deadlock in a dispatch system by monitoring link activity. The dispatch system is comprised of a set of remote units which communicate with each other by broadcasting one at a time to the group. A remote unit communicates with the other remote units through at least one base station. A communications manager grants a remote unit exclusive system talker status upon request through the base station servicing the requesting remote unit. The base station monitors a series of data from the remote unit designated as the system talker to detect voice activity. The base station sends a surrogate request to the communications manager to relinquish the system talker privilege if the voice activity falls below a predetermined threshold.

11 Claims, 2 Drawing Sheets

METHOD AND APPARATUS FOR MONITORING LINK ACTIVITY TO PREVENT SYSTEM DEADLOCK IN A DISPATCH SYSTEM

BACKGROUND OF THE INVENTION

I. Field of the Invention

This invention relates generally to dispatch systems and, more particularly, to the implementation of a dispatch system in a cellular system.

II. Description of the Related Art

In a wireless telephone communication system, many users communicate over a wireless channel to connect to other wireless and wireline telephone systems. Communication over the wireless channel can be one of a variety of multiple access techniques. These multiple access techniques include time division multiple access (TDMA), frequency division multiple access (FDMA), and code division multiple access (CDMA). The CDMA technique has many advantages. An exemplary CDMA system is described in U.S. Pat. No. 4,901,307 issued Feb. 13, 1990 to K. Gilhousen et al., entitled "SPREAD SPECTRUM MULTIPLE ACCESS COMMUNICATION SYSTEM USING SATELLITE OR TERRESTRIAL REPEATERS," assigned to the assignee of the present invention and incorporated herein by reference.

In the just mentioned patent, a multiple access technique is disclosed where a large number of mobile telephone system users, each having a transceiver, communicate through satellite repeaters, airborne repeaters, or terrestrial base station transceiver subsystems using CDMA spread spectrum communication signals. In using CDMA communications, the frequency spectrum can be reused multiple times permitting an increase in system user capacity.

In the CDMA cellular system, each base station transceiver subsystem provides coverage to a limited geographic area and links the remote units in its coverage area through a cellular system switch to the public switched telephone network (PSTN). When a remote unit moves to the coverage area of a new base station transceiver subsystem, the routing of that user's call is transferred to the new base station transceiver subsystem. The base station-to-remote unit signal transmission path is referred to as the forward link and the remote unit-to-base station signal transmission path is referred to as the reverse link.

In a typical wireless telephone communication system, the remote unit may employ a vocoding system which encodes voice information in a variable rate format. In a variable rate system, the data rate may be lowered due to pauses in the voice activity. The lower data rate reduces the level of interference to other users caused by the remote unit transmissions. At the base station a vocoding system is employed for reconstructing the voice information. In addition to voice information, data information alone or a mixture of the two may be transmitted by the remote unit.

When a remote unit is producing its own data for transmission, a internal vocoder produces from digital samples of the voice information encoded data at four different rates, e.g. approximately 8,000 bits per second (bps), 4,000 bps, 2,000 bps and 1,000 bps, based on voice activity during a 20 millisecond (ms) frame. Each frame of vocoder data is formatted with overhead bits as 9,600 bps, 4,800 bps, 2,400 bps, and 1,200 bps data frames. The highest rate data frame which corresponds to a 9,600 bps frame is referred to as a "full rate" frame; a 4,800 bps data frame is referred to as a "half rate" frame; a 2,400 bps data frame is referred to as a "quarter rate" frame; and a 1,200 bps data frame is referred to as an "eighth rate" frame. A vocoder which is suited for application in this environment is described in U.S. Pat. No. 5,414,796, entitled "VARIABLE RATE VOCODER," issued May 9, 1995 and assigned to the assignee of the present invention. When the remote unit receives data from an outside source such as a terminal equipment unit, the remote unit continues to process the data in this variable rate frame format.

When the original cellular telephone spectrum licenses were issued by the government, one of the restrictions on use of the spectrum was that the carriers could not provide dispatch services. However, because of the great advantages of the CDMA system and the inherent expense and problems of deployment and maintenance of private dispatch systems, the government is re-examining this issue. The government itself would benefit greatly from such services.

Whereas typical wireless and wireline telephone service provides point-to-point service, dispatch services provide one-to-many service. Common usage of dispatch services are local police radio systems, taxicab dispatch systems, Federal Bureau of Investigation and secret service operations, and general military communication systems.

The basic model of a dispatch system consists of a broadcast net of users. Each broadcast net user monitors a common broadcast forward link signal. If a net user wishes to talk, he presses a push-to-talk (PTT) button and he is granted system talker privileges. Typically the talking user's voice is routed from the reverse link over the broadcast forward link. Ideally the dispatch system allows landline and wireless access to the system. When the remote unit user has finished speaking, he releases the PTT button. In response the remote unit generates a push-to-talk off indication which terminates the privileges and frees the system for use by other system users.

If the push-to-talk button on a remote unit becomes stuck down, the remote unit may be granted system talker privileges. System resources are thus expended and other remote units may be prevented from accessing the system because the remote unit with the stuck push-to-talk button is blocking the system. This type of scenario is referred to as system deadlock and it is, of course, a highly undesirable state. The present invention is a method and apparatus for detecting system deadlock and truncating its deleterious effects.

SUMMARY OF THE INVENTION

When a remote unit user presses the push-to-talk button, a communications manager may grant the remote unit system talker privileges. When the remote unit has system talker privileges, his voice signal is broadcast to the other remote units which are members of the dispatch system. When the remote unit user releases the push-to-talk button, the communications manager denies the remote unit system talker privileges and thus freeing the system for other remote unit to have the system talker privileges. If the remote unit's push-to-talk button becomes stuck down, the remote unit retains system talker privileges thus preventing other remote units from getting a grant of system talker privileges. The present invention monitors the voice activity of the signal received from the remote unit at the base station. If the voice activity falls below a certain level, it is assumed that the remote unit is no longer in need of system talker privileges and the base station generates a surrogate indication that the push-to-talk button has been released which is sent to the communications manager. In this way the communications manager is free to grant system talker privileges to another remote unit.

BRIEF DESCRIPTION OF THE DRAWINGS

The features, objects, and advantages of the present invention will become more apparent from the detailed description set forth below when taken in conjunction with the drawings wherein.

DESCRIPTION OF THE PREFERRED EMBODIMENT

Figure 1:
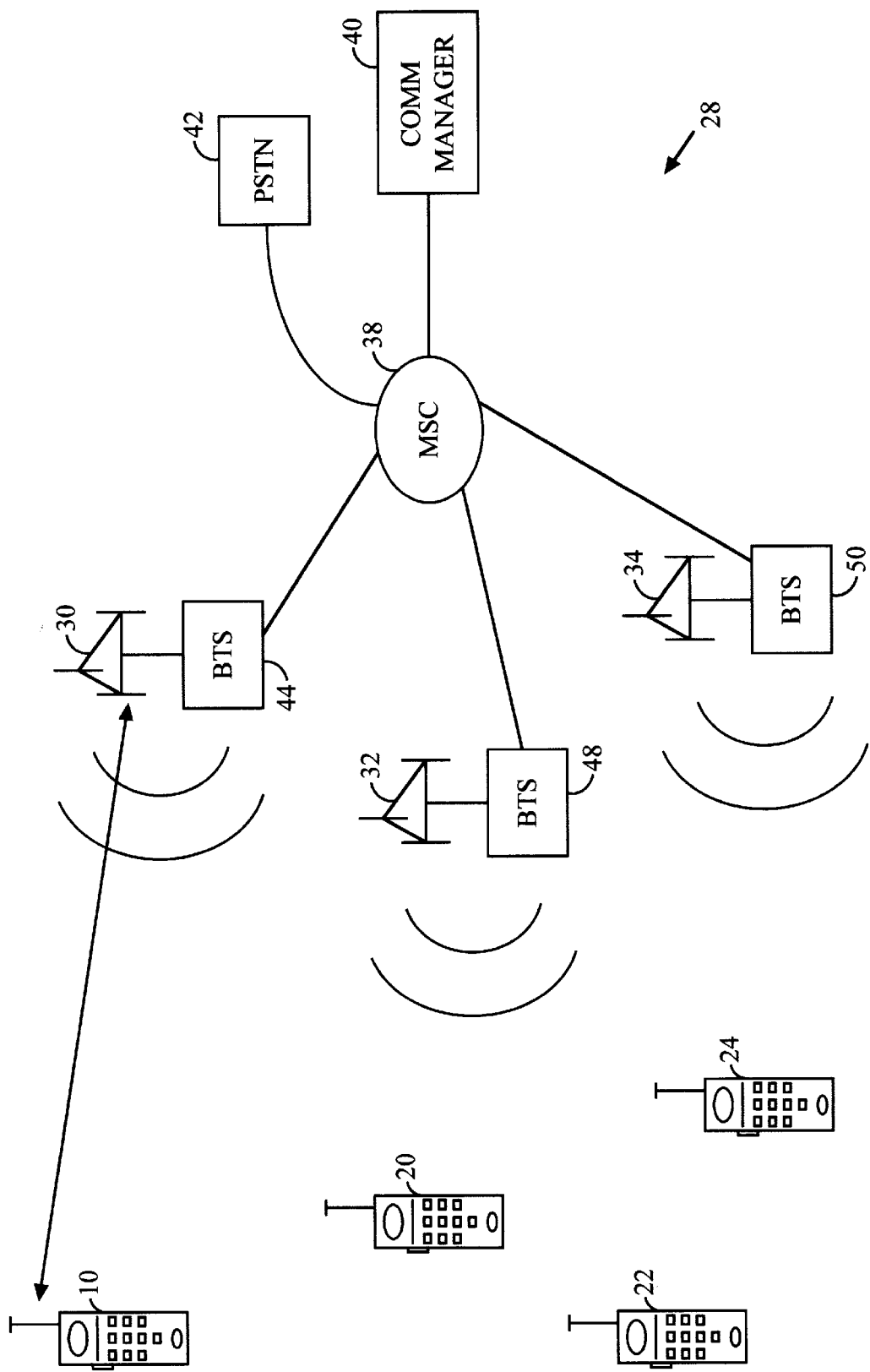
FIG. 1 is a block diagram of a typical dispatch system.

FIG. 1 shows a typical dispatch system. In the preferred embodiment, remote units 10, 20, 22, and 24 may function both as dispatch units and as point-to-point telephones. In FIG. 1, remote unit 10 is currently active and remote units 20, 22, and 24 are currently passive listeners. Base station antennas 30, 32, and 34 may provide the broadcast forward link channel to remote units 20, 22, and 24. Base station antenna 30 transmits and receives a dedicated forward and reverse traffic channel to and from remote unit 10. The dedicated traffic channel is similar to the forward link broadcast channel except that, for example, remote unit 10 may receive other remote unit specific signaling information such as power control commands. Mobile switching center (MSC) 38 coordinates the signaling to and from a set of the base station transceiver subsystems comprising base station transceiver subsystems 44, 48, and 50. The system comprising base station antennas 30, 32, and 34, and base station transceiver subsystems 44, 48, and 50 and MSC 38 is referred to as base station 28. Communication manager 40 controls the net such as the granting system talker privileges to a remote unit whose user has pressed the 'push-to-talk' (PTT) button. In the preferred embodiment, the air interface signaling and modulation is in accordance with the Code Division Multiple Access (CDMA) system described in "Mobile Station-Base Station Compatibility Standard for Dual-Mode Wideband Spread Spectrum Cellular Systems" TIA/EIA/IS-95, generally referred to simply as IS-95. In IS-95, the remote unit is referred to as a mobile station.

It is well known in the art that base station transceiver subsystems may be sectorized such as into three sectors. Where the term base station or base station transceiver subsystem is used herein, it is implied that the term may refer to an entire base station transceiver subsystem or to a single sector of a base station transceiver subsystem.

In FIG. 1 active remote unit 10 has an established bidirectional link with base station transceiver subsystem 44. In order to become active, remote unit 10 sends an access channel message requesting a traffic channel to base station transceiver subsystem 44. The access message is sent on the access channel. The access channel is a reverse link channel used by remote units for communicating to the base station. The access channel is a shared slotted random access channel. Only one remote unit per base station transceiver subsystem sector per frequency channel can successfully use the access channel at one time. The access channel is used for short signaling message exchanges such as call originations, responses to pages, and registration. An access attempt is sent by the remote unit in a series of access probes. Each access probe carries the same information but is transmitted at a higher power level than the previous one. The access probes continue until a base station acknowledgment is received at the remote unit.

When remote unit 10 has established a communication link, it receives any signaling present on the forward broadcast channel on a dedicated forward link traffic channel. In this way, remote unit 10 does not monitor the forward link broadcast channel yet it receives all of the dispatch system information on its own dedicated forward link traffic channel. Remote unit 10 communicates back to base station transceiver subsystem 44 on a dedicated reverse channel. Because remote unit 10 has its own dedicated forward link signal path, remote unit specific messaging may be included in the signaling. For example, if remote unit 10 is capable of operating both as a dispatch system remote unit and as a point-to-point telephone unit, remote unit 10 may be informed on the forward link traffic channel that an incoming point-to-point call is being directed toward remote unit 10.

On the other hand, in FIG. 1, passive remote units 20, 22, and 24 do not have an established reverse link signal to any of the base station transceiver subsystems. Even if remote units 20, 22 and 24 are passive, they still may use the access channel to communicate with the base station. In the preferred embodiment, passive remote units 20, 22 and 24 use the access channel to signal the base station transceiver subsystem if they are in need of more power from the forward link broadcast channel. In response to the power request access message, the base station transceiver subsystem may increase the transmit power level of the forward link broadcast channel.

In a standard CDMA system the process of allocating resources so that the remote unit may become active may take several seconds as well as a substantial amount of processing resources. In order to preserve system resources and to avoid the associated delay, in the preferred embodiment, when a remote unit presses the push-to-talk button, a set of resources is allocated. When the remote unit releases the push-to-talk button, the resources remain dedicated to the remote unit for some period of time. During the time when the user is not depressing the push-to-talk button, the remote unit is designated as active and is said to be hanging. A remote unit which is hanging sends and receives a low rate series of idle messages to preserve the link power control. In this way, when the remote unit user subsequently depresses the push-to-talk button, the link is completely established and immediately responsive. This type of operation accommodates the natural dialog use of a dispatch system. When the pause between push-to-talk activations exceeds a threshold, the resources may be released. After the resources have been released, the remote unit must send an origination message on an access channel to reestablish a connection. Although it is true that at any one time only one remote unit may be talking, more than one remote unit may be active.

The operation of the system described above may be vastly different than standard push-to-talk operation. A typical push-to-talk system is implemented using a common frequency or set of two frequencies. Once a remote unit user has pressed the push-to-talk button, he is transmitting on the common frequency and has blocked all others from accessing the channel. He also blocks the channel by pressing his push-to-talk button even when another user was speaking first. Typically, while the talker is speaking his receiver is disabled to avoid feedback. In this way, when the remote unit user depresses the push-to-talk button and his receiver is disabled, he will not hear his own voice. Therefore if one unit's push-to-talk button is stuck down, not only can no other user access the system but the user himself may not be able to hear a warning message even if an overriding message is transmitted.

In a standard push-to-talk system there is no request of system talker privileges and a corresponding grant of system talker privileges. Also there is no way to deny system talker privileges after a remote unit has pressed the push-to-talk button. Also in a typical system it is difficult to detect voice activity. The present invention is much different. In the preferred embodiment, a CDMA multiple access technique is used. (In alternative embodiments other multiple access techniques may be used.) In a CDMA system, more than one remote unit may transmit on the same frequency at the same time. Even if the remote unit continually transmits, other remote units in the area remain able to use the same frequency to communicate on the access channel, dedicated traffic channels, and forward link broadcast channel as well as others. Also note that while the remote unit is talking and generating a reverse link traffic channel signal, it continues to receive the forward link traffic channel signal. If the remote unit user's voice is not included in the forward link traffic channel signal, the speaker on the remote unit may remain enabled while the remote unit is designated as the system talker. In this way, a privileged unit could generate a voice message for the remote unit even when his push-to-talk button is depressed.

When the user initially presses the push-to-talk button, a PTT_on indication is sent from the remote unit to the base station. When the user releases the push-to-talk button, a PTT_off indication is sent from the remote unit to the base station. Nominally, until the PTT_off indication is received, no other user may be granted push-to-talk access. One aspect of the present invention addresses the situation in which a push-to-talk button malfunctions such that no PTT_off indication is transmitted.

In the preferred embodiment, the remote unit comprises a multirate vocoder. A multirate vocoder transmits at a low rate when voice or data activity is minimized and transmits at higher rates when the level voice or data activity is high. In the preferred embodiment, the internal vocoder produces encoded data from digital samples of the voice information at four different rates, e.g. approximately 8,000 bits per second (bps), 4,000 bps, 2,000 bps and 1,000 bps, based on voice activity during a 20 millisecond (ms) frame. Each frame of vocoder data is formatted with overhead bits as 9,600 bps, 4,800 bps, 2,400 bps, and 1,200 bps data frames. The highest rate data frame which corresponds to a 9,600 bps frame is referred to as a "full rate" frame; a 4,800 bps data frame is referred to as a "half rate" frame; a 2,400 bps data frame is referred to as a "quarter rate" frame; and a 1,200 bps data frame is referred to as an "eighth rate" frame. A vocoder which is suited for application in this environment is described in U.S. Pat. No. 5,414,796, entitled "VARIABLE RATE VOCODER," issued May 9, 1995 and assigned to the assignee of the present invention. Even when the remote unit receives data from an outside source such as a terminal equipment unit, the remote unit continues to process the data in this variable rate frame format. The present invention may make use of the fact that if minimal link data is present, the vocoder sends eighth rate frames.

There are two different scenarios that are addressed by the present invention. In the first scenario, the user presses the push-to-talk button. The remote unit sends a PTT_on indication and receives a channel assignment. However, either intentionally or unexpectedly the user does not speak. Additionally, no PTT_off indication is received at the base station. The base station may not receive the PTT_off indication if the user does not release the push-to-talk button. The base station may not receive the PTT_off indication if the button is stuck on or the remote unit is otherwise malfunctioning.

In a similar but slightly different second scenario, the user presses the push-to-talk button. The remote unit sends a PTT_on indication and receives a channel assignment. The user speaks and sends voice traffic to the other net members. However, either intentionally or unexpectedly the user stops speaking for an extended period of time. Again, no PTT_off indication is received at the base station. The base station may not receive the PTT_off indication if the user does not release the push-to-talk button. The base station may not receive the PTT_off indication if the button is stuck on or the remote unit is otherwise malfunctioning.

In either scenario, unless one of the members of the net has been designated a higher priority user and can 'interrupt' the errant remote unit, the system is in deadlock. In such a case, no other remote unit on the net may become the talker thus disabling the network. The present invention prevents such a deadlock by monitoring the link (voice or data) activity. The present invention may be used in conjunction with other mechanisms to prevent deadlock and to regulate system access such as those described in U.S. patent application Ser. No. 08/671,132 entitled "METHOD AND APPARATUS FOR ACCESS REGULATION AND SYSTEM PROTECTION OF A DISPATCH SYSTEM" which was filed Jun. 24, 1996 and is assigned to the assignee hereof and in U.S. patent application Ser. No. 08/671,131 entitled "METHOD AND APPARATUS FOR EFFICIENT SYSTEM ACCESS IN A DISPATCH SYSTEM" which was filed Jun. 24, 1996 and is assigned to the assignee hereof.

There are several ways in which to detect link activity. If a vocoder similar to the one described above is used, the average number of low rate frames received over a period of time may be determined. This method also is applicable to data transmissions. In this way, if background noise causes occasional higher rate frames, the lack of a valid continuous voice signal is still detected. Other fixed rate digital vocoders may use different encoding methods depending on whether the audio signal is voice or non-voice noise. The base station may monitor an indication of the type of encoding used to encode the signal to detect link activity. Another scheme may monitor the spectral content of the encoded signal to determine the presence or absence of voice. The absence of data on data connection may be even easier to detect. For example, the base station may simply look at the number of transitions in the incoming signal or the average number of bits with value '1' as compared to the total number of bits.

Figure 2:
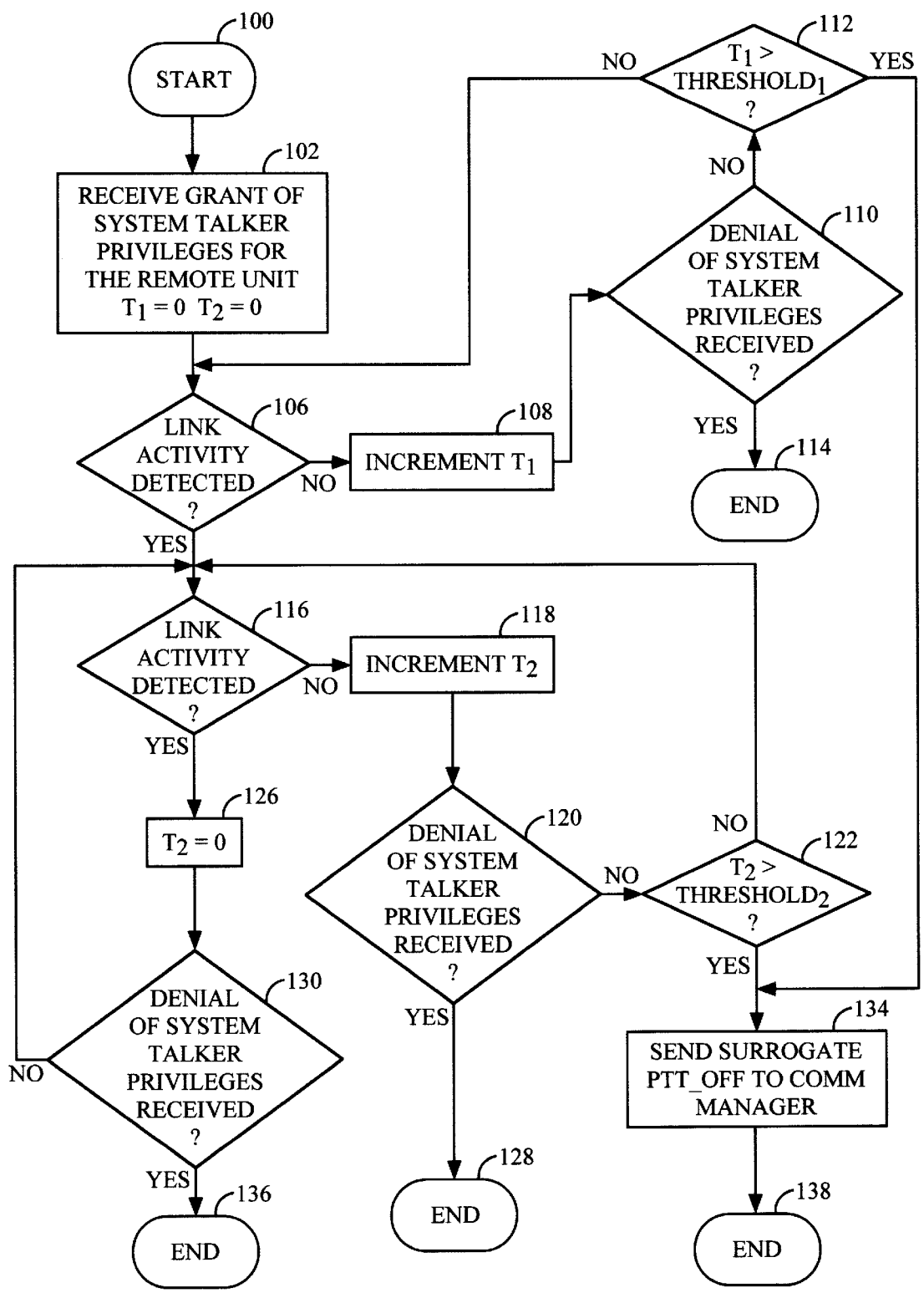
FIG. 2 is a flow chart showing an exemplary set of steps to implement the present invention.

FIG. 2 is a flow chart with which the basic operation of the present invention is explained. In the preferred embodiment, the system is executed by base station 28 (of FIG. 1). The system most likely resides in MSC 38 (of FIG. 1) while several of the operations may take place within the base station transceiver subsystems. In the most general embodiment, the system may be located in any part of the communications system. The system shown in FIG. 2 is executed once for each remote unit which is granted system talker privileges.

From start block 100, operation begins when a grant of system talker privileges is received for the remote unit, block 102. Such a grant is typically in response to a PTT_on indication received from the remote unit. The two counts are set to an initial value also in block 102. As the first data is transferred from the remote unit to the base station, the base station determines whether or not there is sufficient link activity to indicate receipt of an active voice or data communication, block 106. If not, the $T_1$ count is incremented to reflect the passage of time, block 108. Block 110 asks if a denial of system talker privileges has been received.

Such a denial may be received if the remote unit releases the push-to-talk button or if the remote unit is interrupted by another remote unit. If a denial has been received, the flow ends in block 114. If no denial has been received, flow continues to block 112. If the $T_1$ count does not exceed the threshold, threshold$_1$, in block 112, the flow continues back to block 106. If the $T_1$ count exceeds the threshold, threshold$_1$, in block 112, the base station generates a surrogate PTT_off indication to send to the communications manager, block 134 thereby freeing the system for use by other remote units.

If link activity is detected in block 106, a second phase of the flow chart addressing the second scenario above is entered. As the data continues to be transferred from the remote unit to the base station, block 116 monitors for link activity. If there is not sufficient link activity to indicate receipt of an active voice or data communication, the $T_2$ count is incremented to reflect the passage of time in block 118. Block 120 asks if a denial of system talker privileges has been received. If a denial has been received, the flow ends in block 128. If no denial has been received, flow continues to block 122. If the $T_2$ count does not exceed the threshold, threshold$_2$, in block 122, the flow continues back to block 116. If the $T_2$ count exceeds a threshold, threshold$_2$, in block 122, the base station generates a surrogate PTT_off indication to send to the communications manager, block 134 thereby freeing the system for use by other remote units and flow ends in block 138. If the link activity is detected in block 116, the $T_2$ count is reset, block 126. Block 130 asks if a denial of system talker privileges has been received. If a denial has been received, the flow ends in block 136. If no denial has been received, flow continues to block 116.

The mechanism deployed in blocks 106 and 116 to detect link activity may be the same or different. One example of a link detection mechanism is to count the average number of low rate frames received over a certain period. In this way, if background noise causes occasional higher rate frame, the lack of a valid continuous voice signal is still detected. In the preferred embodiment, vocoder frames are transferred over the air at a rate of one per 20 msec. The mechanisms of blocks 106 and 116 may monitor 16 consecutive frames. If 15 out of 16 of the frames comprise eighth rate data, the link activity is not sufficient to indicate active use.

When the base station sends the communications manager the surrogate PTT_off indication, the communications manager may or may not be able to distinguish the surrogate indication from a PTT_off indication received directly from the remote unit. When the communications manager receives the surrogate PTT_off indication, it may respond by sending a denial of system talker privileges to the remote unit. If the communications manager cannot distinguish between the surrogate PTT_off indication and a remote unit generated PTT_off indication, it may send the denial in response to every PTT_off indication that it receives. If it can distinguish between the two, the communications manager need only send a denial when a surrogate PTT_off is received. In the preferred embodiment, the denial is sent on the reverse link traffic channel to the remote unit. In response to the denial, the remote unit may stop transmitting an active voice signal and either become inactive or enter a hanging state. The remote unit may respond by alerting the user or by taking corrective action.

Note what the flow chart shown in FIG. 2 operates to accomplish. The top loop, generally comprised of blocks 106, 108, 110, and 112, is concerned with the first scenario. The top loop monitors link activity until active voice or data communication is received. If the upper loop is exited, the lower loop, generally comprised of blocks 116, 118, 120, and 122, is concerned with the second scenario. The lower loop continues to monitor the link activity of the incoming signal as the call progresses. Note that the threshold$_1$ and threshold$_2$ values need not be the same value. If they are selected as the same value, the loop collapses into a single loop. In a most general situation, threshold$_1$ has a smaller value than threshold$_2$. It is assumed that if a user initially presses the push-to-talk button it is because he has something he wants to communicate. If he does not begin to communicate the message immediately it is probably because there has been an error or an intentional attempt to deadlock the system. Threshold$_2$ is longer because once the user has begun to speak, it is assumed he may pause during the speech. The threshold$_1$ may have a value such as 5–10 seconds. The threshold$_2$ may have a value such as 10–20 seconds.

In the most general embodiment, the present invention is a method and apparatus for monitoring the absence of voice or data information in a push-to-talk system to prevent system deadlock. Of course the general principles illustrated in FIG. 2 could be applied to a great many different embodiments. For example, the lowest rate frame may not be an eighth rate frame in an alternative embodiment. The present invention would also prevent deadlock if a microphone or other voice path component failed in the remote unit such that no voice signal was transmitted from the remote unit.

There are many variations and implementations which fall within the scope of the present invention. An implementation may comprise all the elements of the present invention and yet not follow exactly the flow charts of FIG. 2. For example, explicit in the above diagram is the fact that if at any time the base station receives a PTT_off indication from the remote unit, the entire flow chart process is aborted. Obviously the same effect could be achieved by using interrupts rather than periodic inquiry. Also the blocks may be reordered within the flow without effecting the operation of the system. Also note that even though the text herein refers to 'remote' units, some of the units may be wireline units.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method of preventing deadlock in a push-to-talk dispatch system comprising a broadcast net of users in which one user at a time is granted system talker privileges, comprising the steps of:

monitoring a reverse link traffic signal from a remote unit that currently holds a system talker privilege; and denying said system talker privilege from said remote unit if a lack of link activity is detected in said reverse link traffic channel.

2. The method of claim 1 wherein the step of denying said system talker privilege comprises the steps of:

sending, from a base station to a communications manager, a surrogate request to deny said system talker privilege to said remote unit;

responding to said surrogate request by said communications manager by sending a denial of system talker privilege from said communications manager to said base station; and sending said denial of system talker privilege from said base station to said remote unit.

3. The method of claim 1 wherein the step of monitoring comprises the steps of:

examining a spectral content of said reverse link traffic signal;

determining said lack of link activity if said spectral content does not indicate the presence of voice.

4. The method of claim 1 wherein said reverse link traffic signal comprises digital data and wherein the step of monitoring further comprises the steps of:

determining an average number of occurrences of the logic state of "1" in said digital data as compared to a total amount of digital data received; and determining said lack of link activity based on said average number of occurrences.

5. The method of claim 1 wherein said reverse link traffic signal comprises digital data and wherein the step of monitoring comprises the steps of:

examining the number of transitions of said digital data; and determining said lack of link activity based on said number of transitions.

6. The method of claim 1 wherein said reverse link traffic signal comprises variable rate data organized in frames, each frame having one of a set of preselected data rates, wherein the step of monitoring further comprises the steps of:

determining, at a base station, an average number of frames in said reverse link traffic signal at a lowest one of said set of preselected data rates; and determining said lack of link activity based on said average number of frames in a first predetermined time period.

7. The method of claim 6 wherein the step of determining said lack of link activity comprises the steps of:

determining whether or not sufficient link activity exists in an initial reverse link traffic signal from said remote unit; and determining said lack of link activity based on said average number of frames in said first predetermined time period if said sufficient link activity exists, or in a second predetermined time period if said sufficient link activity does not exist.

8. The method of claim 7 wherein the step of determining whether or not sufficient link activity exists comprises the step of detecting, in said reverse link traffic signal, a number of frames at a data rate other than said lowest one of said preselected data rates.

9. A system for preventing deadlock in a push-to-talk dispatch system comprising a broadcast net of users in which one user at a time is granted system talker privileges, comprising:

a first remote unit, said first remote unit for transmitting variable rate data to at least one other remote unit and for requesting a system talker privilege;

a base station for receiving said variable rate data, for broadcasting said variable rate data to at least one other remote unit, for monitoring said variable rate data to detect link activity, and for generating a surrogate PTT_off indication when said link activity is less than a predetermined level; and a communications manager for granting and denying said system talker privilege, for receiving said surrogate PTT_off indication, and for transmitting a release indication signal to said base station.

10. An apparatus for preventing deadlock in a push-to-talk dispatch system comprising a broadcast net of users in which one user at a time is granted system talker privileges,, comprising:

means for monitoring a reverse link traffic signal from a first remote unit holding a system talker privilege; and means for sending a surrogate PTT_off indication to a communications manager if a lack of link activity is detected in said reverse link traffic signal.

11. A method of preventing deadlock in a push-to-talk dispatch system comprising a broadcast net of users in which one user at a time is granted system talker privileges, comprising the steps of:

monitoring a reverse link traffic signal from a remote unit that currently holds a system talker privilege;

sending a surrogate request to a communications manager to deny system talker privilege to the remote unit if a lack of link activity is detected in the reverse link traffic channel;

sending a denial of system talker privilege from said communications manager to a base station in response to said surrogate request; and sending said denial of system talker privilege from the base station to the remote unit.

* * * * *